United States Patent [19]

Mori et al.

[11] Patent Number: 4,959,333
[45] Date of Patent: Sep. 25, 1990

[54] NON-REDUCING DIELECTRIC CERAMIC COMPOSITION

[75] Inventors: Yoshiaki Mori, Nagaokakyo; Hiroshi Takagi, Ohtsu; Masaru Fujino, Nagaokakyo; Yukio Sakabe, Kyoto, all of Japan

[73] Assignee: Murata Manufacturing Co., Ltd., Japan

[21] Appl. No.: 386,790

[22] Filed: Jul. 27, 1989

[30] Foreign Application Priority Data

Jul. 28, 1988 [JP] Japan ............................... 63-188696

[51] Int. Cl.$^5$ ............................................. C04B 35/46
[52] U.S. Cl. ..................................... 501/136; 501/134; 501/135
[58] Field of Search ..................... 501/134, 135, 136

[56] References Cited

U.S. PATENT DOCUMENTS

| | | | |
|---|---|---|---|
| 4,339,544 | 7/1982 | Sakabe et al. | 501/136 |
| 4,700,265 | 10/1987 | Kishi et al. | 361/321 |
| 4,723,193 | 2/1988 | Chazono et al. | 361/321 |
| 4,753,905 | 6/1988 | Nishioka et al. | 501/136 |
| 4,809,130 | 2/1989 | Chazono et al. | 361/321 |
| 4,809,131 | 2/1989 | Chazono et al. | 361/321 |

*Primary Examiner*—Mark L. Bell
*Assistant Examiner*—Deborah Jones
*Attorney, Agent, or Firm*—Ostrolenk, Faber, Gerb & Soffen

[57] ABSTRACT

A non-reducing dielectric ceramic composition consists essentially of a basic composition expressed by the general formula: $xPb(Mg_{\frac{1}{3}}Nb_{\frac{2}{3}})O_3 - yPb(Zn_{\frac{1}{3}}Nb_{\frac{2}{3}})O_3 - zPbTiO_3$ where x, y and z are percentages by weight of the respective component and take values within the following respective ranges $98.5 \leq x \leq 59.5$, $1.0 \leq y \leq 40.0$, $0.5 \leq z \leq 10.0$, and an anti-reducing agent incorporated therein and expressed by the general formula: $aLi_2O - bRO - cB_2O_3 + (1-a-b-c)SiO_2$ where R is at least one element selected from the group consisting of Mg, Ca, Sr and Ba, a, b, and c are molar ratios of the respective component and take values within the following respective ranges: $0 \leq a \leq 0.2$, $0.1 \leq b \leq 0.55$, $0 \leq c \leq 0.4$.

1 Claim, 1 Drawing Sheet

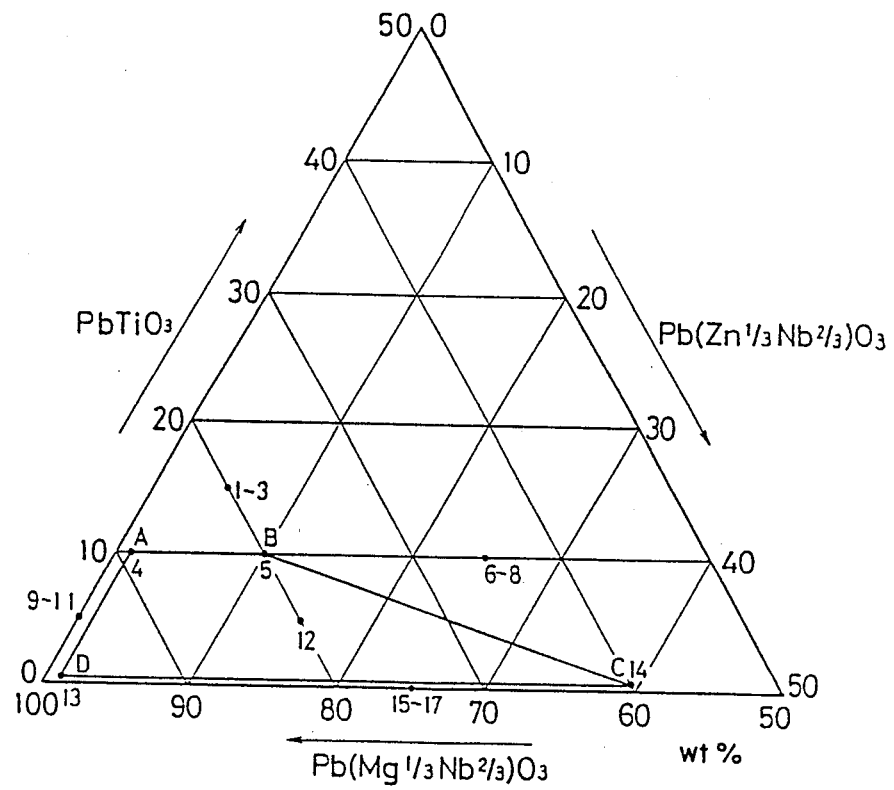

NON-REDUCING DIELECTRIC CERAMIC COMPOSITION

FIELD OF THE INVENTION

The present invention relates to a non-reducing dielectric ceramic composition and, more particularly, to a non-reducing dielectric ceramic composition comprising a basic composition of a complex perovskite lead compound and an anti-reducing agent incorporated therein.

BACKGROUND OF THE INVENTION

In general, dielectric ceramic materials of a lead titanate system have widely been used as a dielectric material for ceramic capacitors because of its relatively high dielectric constant and a low sintering temperature. For example, lead titanate dielectric ceramic compositions have been applied to monolithic or multilayer ceramic capacitors. Such multilayer ceramic capacitors are generally fabricated by first preparing ceramic green sheets, printing a conductive ink for internal electrodes (composed of metal powder suspended in an organic vehicle) in the designed pattern on the ceramic green sheets, bonding several printed green sheets one on another under heat and pressure, cutting the resultant stack into individual capacitor units, and firing them to complete multilayer ceramic capacitor units.

Most of the conventional dielectric ceramic materials for multilayer ceramic capacitors must be fired in an oxidizing atmosphere since these ceramic materials are reduced to a semiconductive material when fired in a reducing atmosphere with a low partial pressure of oxygen. For this reason, it is required to use a noble metal such as, for example, Ag—Pd alloys, which are stable even in an oxidizing atmosphere at a high temperature, as a material for internal electrodes.

However, the noble metal materials are expensive and causes lowering of dielectric properties since migration of Ag takes place during sintering. Also, the Ag—Pd alloys are low in electric conductivity.

SUMMARY OF THE INVENTION

It is therefore an object of the present invention to provide a non-reducing dielectric ceramic composition which is never reduced to a semiconductive material even if fired in a neutral or reducing atmosphere and makes it possible to use copper or copper alloys with a high conductivity as a material for internal electrodes to produce multilayer ceramic capacitors.

According to the present invention, the above and other objects are achieved by incorporating a certain amount of an anti-reducing agent of a system, $Li_2O$—$RO$—$B_2O_3$—$SiO_2$ (where R is at least one element selected from the group consisting of Mg, Ca, Sr and Ba) into a basic dielectric ceramic composition of a ternary system, $Pb(Mg_{\frac{1}{3}}Nb_{\frac{2}{3}})O_3$—$Pb(Zn_{\frac{1}{3}}Nb_{\frac{2}{3}})O_3$—$PbTiO_3$.

The incorporation of the anti-reducing agent prevents the basic dielectric ceramic composition from reduction during firing in a reducing atmosphere, thus making it possible to produce dielectric materials with high specific resistance of not less than $10^{10}$ Ω-cm and dielectric loss of not more than 5 %. This also makes it possible to use cheap copper or copper alloys with high conductivity as a material for internal electrodes of the multilayer ceramic capacitors. In addition, the incorporation of the anti-reducing agent makes it possible to sinter the dielectric ceramic composition at a lower firing temperature.

The above and other objects, features and advantages of the present invention will be further apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this description.

BRIEF EXPLANATION OF THE DRAWINGS

Figure is a ternary phase diagram showing the compositional area falling in the scope of the present invention.

DETAILED DESCRIPTION OF THE INVENTION

According to the present invention there is provided a non-reducing dielectric ceramic composition consisting essentially of a basic composition expressed by the general formula:

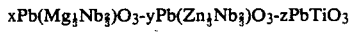

where x, y and z are proportions by weight percentage of the three components, $Pb(Mg_{\frac{1}{3}}Nb_{\frac{2}{3}})O_3$, $Pb(Zn_{\frac{1}{3}}Nb_{\frac{2}{3}})O_3$ and $PbTiO_3$, and an anti-reducing agent incorporated therein and expressed by the general formula:

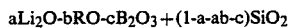

where R is at least one element selected from the group consisting of Mg, Ca, Sr and Ba, a, b and c are molar fractions of the respective component and take values within the following respective ranges: $0 \leq a < 0.2$, $0.1 \leq b < 0.55$, $0 \leq c < 0.4$, said basic composition having a set of proportions, by weight percentage, of the three components, x, y and z, falling within the compositional area encompassed by the polygon ABCD defined by points A, B, C and D shown in FIG. 1, the sets of proportions, by weight percentage, of the three components at said points being as follows:

| x | y | z |
| --- | --- | --- |
| 89.0 | 1.0 | 10.0 |
| 80.0 | 10.0 | 10.0 |
| 59.5 | 40.0 | 0.5 |
| 98.5 | 1.0 | 0.5 |

In the preferred embodiments, there is provided a non-reducing dielectric ceramic composition consisting essentially of 60 to 99.95 wt% of a basic composition expressed by the general formula:

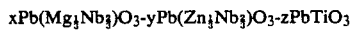

where $x + y + y = 100$, and 0.05 to 40 wt % of an anti-reducing agent having a composition expressed by the general formula:

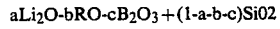

where R is at least one element selected from the group consisting of Mg, CA, Sr and Ba, and wherein a, b, and c are molar fractions of the respective components and take values within the following ranges: $0 \leq a < 0.2$, $0.1 \leq b < 0.55$, $0 \leq c < 0.4$.

The basic composition of the present invention has been limited to those having the set of proportions by weight percentage of x, y and z falling within the polygonal area defined by the points A, B, C and D in FIG. 1 for the following reasons. If the basic composition has the set of proportions out of the line connecting the points A and B in FIG. 1, the specific resistance at 20° C. becomes lower than $10^{10}$ Ω-cm irrespective of incorporation of the anti-reducing agent when fired in a reducing atmosphere. If the basic composition has the set of proportions out of a line connecting the points B and C, the dielectric loss (tan δ) becomes more than 5 % irrespective of the incorporation of the anti-reducing agent when fired in the reducing atmosphere. If the basic composition has the set of proportions out of a line connecting the points C and D, the specific resistance at 20° C. becomes lower than $10^{10}$ Ω-cm irrespective of incorporation of the anti-reducing agent when fired in a reducing atmosphere. If the basic composition has the set of proportions out of the line connecting the points A and D, the specific resistance at 20° C. becomes lower than $10^{10}$ Ω-cm and the dielectric loss becomes 5% and up when fired in a reducing atmosphere irrespective of incorporation of the anti-reducing agent.

The content of each component in the anti-reducing agent has been limited to the above range for the following reasons: If the content of $Li_2O$, i.e., a is less than 20 mol %, it causes lowering in the dielectric properties and deformation of the product resulting from fusion of the anti-reducing agent. If the content of RO (R represents Mg, Ca, Sr and/or Ba), i.e., b is less than 10 mol %, it is impossible to fire the composition in a reducing atmosphere with an oxygen pressure of not more than $10^{-7}$ atm, which makes it possible to use copper or copper alloys as the internal electrodes. If b exceeds 55 mol %, or if the content of $B_2O_3$, i.e., y exceeds 40 mol %, the sintering temperature becomes higher than 1050° C., which causes fusion of copper or copper alloy electrodes.

The anti-reducing agent is incorporated into the basic composition in an amount of from 0.05 to 40 wt% for the following reasons. If the content of the anti-reducing agent is less than 0.05 wt %, it is impossible to prevent the dielectric ceramics from reduction, resulting in lowering of the insulation resistance. If the content of the antireducing agent exceeds 40 wt %, fusion of the agent takes place in the course of sintering and causes deformation of the product.

EXAMPLE 1

Raw materials, $Pb_3O_4$, $MgCO_3$, $Nb_2O_5$, $TiO_2$ and ZnO were weighed to prepare a mixture so that its product has a composition of a ternary system $80Pb(Mg_{\frac{1}{3}}Nb_{\frac{2}{3}})O_3$-$15Pb(An_{\frac{1}{3}}Nb_{\frac{2}{3}})O_3$-$5PbTiO_3$, milled for 16 hours by the wet process with a ball mill and then dried by evaporation. The resultant mixed powder was put into a zirconia saggar, calcined in air at 730° C. for 2 hours, crushed and then passed through a 200 mesh screen to prepare calcined powder of a dielectric ceramic composition with a complex perovskite structure.

On the other hand, using $Li_2O$, $BaCO_3$, $CaCO_3$, SrO, MgO, $B_2O_3$ and $SiO_2$ as raw materials, there were prepared anti-reducing agents in the following manner. The raw materials were weighed to prepare a mixtures for anti-reducing agents each having a composition shown in Table 1, milled with a ball mill by the wet process for 16 hours, and then dried by evaporation. Each resultant powder was placed in an alumina crucible, heated at 1300° C. for 1 hour, vitrified by rapid cooling, powdered, and then passed through a 80 mesh screen to prepare powder of vitreous anti-reducing agent.

The thus prepared vitreous anti-reducing agent was added to the above calcined powder in the proportions shown in Table 1 to prepare a mixture for non-reducing dielectric ceramic composition. The resultant mixture was added with a suitable amount of a polyvinyl butyral binder, granulated by the wet process in a ball mill for 16 hours, molded by the doctor blade process, and then dried to prepare ceramic green sheets. The ceramic green sheets were screen printed with a copper paste for internal electrodes in the designed pattern on each one surface thereof, contact bonded under heat and pressure, and then cut into individual capacitor units. The resultant capacitor units were coated with copper paste for external electrodes, and then fired with an electric furnace at temperatures of 700° to 1100° C. for 3 hours in a reducing atmosphere composed of a mixed gas of $H_2$, $H_2O$ and $N_2$ to prevent internal and external copper electrodes from oxidation. A specimen No. 1 was fired in air, i.e., an oxidizing atmosphere.

The thus prepared multilayer ceramic capacitors were immersed in a fuchsin solution to determine the optimum sintering temperature. The results are listed in Table 1.

Using the multilayer ceramic capacitors fired at the optimum sintering temperature as test specimens, the measurement was made on electrical properties, i.e., dielectric constant ( ε) and dielectric loss (tan δ) at 25° C. and at 1 KHz, 1 Vrms, the temperature characteristics of capacitance at temperatures ranging from −25° C. to 85° C. on the basis of the capacitance at 20° C., and insulation resistance. The specific resistance ( ρ) was determined by measurement of a current flowing through the specimen when applied with a DC voltage of 50 volts at 20° C. Results are shown in Table 1.

EXAMPLE 2

Using raw materials, $Pb_3O_4$, $MgCO_3$, $Nb_2O_5$, $TiO_2$ and ZnO, there were prepared calcined powder of dielectric ceramic compositions each having a composition shown in Table 1, in the same manner as in Example 1.

Separate from the above, using $Li_2O$, $BaCO_3$, $CaCO_3$, SrO, MgO, $B_2O_3$ and $SiO_2$ as raw materials, there was prepared a vitreous anti-reducing agent having a composition composed of, by mol %, $5Li_2O$, $15BaO$, $15CaO$, $15SrO$, $20lB_2O_3$ and $30SiO_2$ in the same manner as in Example 1.

Using the the calcined powder of the dielectric ceramic composition mixed with the resultant vitreous anti-reducing agent in the proportions shown in Table 2, there were prepared multilayer ceramic capacitors in the same manner as in Example 1.

For each multilayer ceramic capacitor, electric properties were measured in the same manner as in Example 1. Results are shown in Table 2.

In Tables 1 and 2, specimens with an asterisk (*) are those having a composition beyond the scope of the present invention, while other specimens are those included in the scope of the present invention. Also, the basic composition and anti-reducing agent are represented by symbols A and B, respectively. The temperature characteristics of the specimens are classified with the ratings B, C, D, E and F established by JIS (Japanese Industrial Standard), which are defined as bellow.

B rating, means that a temperature change rate of capacitance with respect to a capacitance at 20° C. lies within the range of −10 to +10 % at an operating temperature range of −25° C. to +85° C.

C rating, means that a temperature change rate of capacitance with respect to a capacitance at 20° C. lies within the range of −55 to +20 % at an operating temperature range of −25° C. to +85° C.

F rating, means that temperature change rate of capacitance with respect to a capacitance at 20° C. lies within the range of −80 to +30 % at an operating temperature range of −25° C. to +85° C.

TABLE 1

| No. | Mixed ratio A | B | Anti-reducing agent (mol %) Li$_2$O | BaO | CaO | SrO | MgO | B$_2$O$_3$ | SiO$_2$ | Sintering temp. (°C.) | ε | tan δ (%) | ρ (Ω-cm) | Class |
|---|---|---|---|---|---|---|---|---|---|---|---|---|---|---|
| 1* | 100 | 0 | 0 | 0 | 0 | 0 | 0 | 0 | 0 | 1050 | — | — | — | — |
| 2* | 100 | 0 | 0 | 0 | 0 | 0 | 0 | 0 | 0 | 1050 | 8900 | 15.0 | 10$^6$ | C |
| 3* | 99.96 | 0.04 | 5 | 15 | 15 | 15 | 0 | 20 | 30 | 1050 | 10000 | 5.0 | 10$^8$ | F |
| 4 | 99.95 | 0.05 | " | " | " | " | " | " | " | 1050 | 12600 | 2.5 | >10$^{10}$ | F |
| 5* | 99.9 | 0.1 | " | 55 | 0 | 0 | " | " | 20 | >1050 | " | " | — | — |
| 6* | " | " | " | 0 | 55 | " | " | " | " | " | " | " | — | — |
| 7* | " | " | " | " | 0 | 55 | " | " | " | " | " | " | — | — |
| 8* | " | " | " | " | " | 0 | 55 | " | " | " | " | " | — | — |
| 9 | 99.9 | 0.1 | 6 | 54 | " | 0 | 0 | " | " | 1050 | 12500 | 2.6 | >10$^{10}$ | F |
| 10 | " | " | " | 0 | 54 | " | " | " | " | " | " | " | " | " |
| 11 | " | " | " | " | 0 | 54 | " | " | " | " | " | " | " | " |
| 12 | " | " | " | " | " | 0 | 54 | " | " | " | " | " | " | " |
| 13* | " | " | 6 | 9 | " | 0 | 0 | 35 | 50 | " | 9500 | 7.0 | 10$^8$ | " |
| 14* | " | " | " | 0 | 9 | " | " | " | " | " | 9600 | 8.0 | " | " |
| 15* | " | " | " | " | 0 | 9 | " | " | " | " | 9500 | 7.5 | " | " |
| 16 | " | " | " | 10 | " | 0 | " | 34 | " | " | 10300 | 2.8 | >10$^{10}$ | " |
| 17 | " | " | " | 0 | 10 | " | " | " | " | " | 10200 | " | " | " |
| 18 | " | " | " | " | 0 | 10 | " | " | " | " | 10400 | " | " | " |
| 19* | " | " | 20 | 10 | 10 | " | " | 20 | 30 | " | — | — | — | — |
| 20 | " | " | 19 | " | " | " | " | " | 31 | " | 12000 | 2.9 | >10$^{10}$ | F |
| 21* | " | " | 5 | " | " | " | " | 40 | 25 | " | — | — | — | — |
| 22 | " | " | " | " | " | " | " | 39 | 26 | " | 11600 | 2.9 | >10$^{10}$ | F |
| 23 | " | " | " | 0 | 0 | 0 | 45 | 20 | 30 | " | 11000 | 3.0 | " | " |
| 24 | " | " | " | 15 | 15 | 15 | 0 | 20 | 30 | 1045 | 12500 | 2.5 | " | " |
| 25 | 99.5 | 0.5 | " | " | " | " | " | " | " | 1030 | 12400 | " | " | " |
| 26 | 99.0 | 1.0 | " | " | " | " | " | " | " | 1000 | 11800 | " | " | " |
| 27 | 98.0 | 2.0 | " | " | " | " | " | " | " | 980 | 9900 | 2.3 | " | " |
| 28 | 95.0 | 5.0 | " | " | " | " | " | " | " | 950 | 6100 | 2.2 | " | E |
| 29 | 90.0 | 10 | " | " | " | " | " | " | " | 910 | 2300 | 1.8 | " | D |
| 30 | 85.0 | 15 | " | " | " | " | " | " | " | 890 | 1900 | 1.5 | " | C |
| 31 | 80.0 | 20 | " | " | " | " | " | " | " | 850 | 1500 | 0.8 | " | " |
| 32 | 70 | 30 | " | " | " | " | " | " | " | 770 | 950 | 0.3 | " | B |
| 33 | 65 | 35 | " | " | " | " | " | " | " | 750 | 700 | 0.2 | " | " |
| 34 | 60 | 40 | " | " | " | " | " | " | " | 730 | 600 | 0.1 | " | " |
| 35* | 59 | 41 | " | " | " | " | " | " | " | 730 | — | — | " | " |

TABLE 2

| No. | Mixed ratio A | B | Basic composition x | y | z | Sintering temp. (°C.) | ε | tan δ (%) | ρ (Ω-cm) | Class |
|---|---|---|---|---|---|---|---|---|---|---|
| 36* | 99.95 | 0.05 | 80.0 | 5.0 | 15.0 | 1050 | 10000 | 2.8 | 10$^6$ | F |
| 37* | 90.0 | 10.0 | " | " | " | 890 | 1500 | 2.5 | 10$^8$ | D |
| 38* | 60.0 | 40.0 | " | " | " | 750 | 700 | 2.7 | " | B |
| 39 | 95.0 | 5.0 | 89.0 | 1.0 | 10.0 | 950 | 3100 | 1.8 | >10$^{10}$ | E |
| 40 | 85.0 | 15.0 | 80.0 | 10.0 | 10.0 | 900 | 1500 | 2.0 | " | D |
| 41* | 99.95 | 0.05 | 65.0 | 17.5 | 17.5 | 1050 | 9500 | 15.0 | " | F |
| 42* | 90.0 | 10.0 | " | " | " | 900 | 2000 | 8.4 | " | C |
| 43* | 60.0 | 40.0 | " | " | " | 730 | 800 | 7.9 | " | B |
| 44* | 99.95 | 0.05 | 95.0 | 0 | 5.0 | 1000 | 9800 | 2.8 | 10$^5$ | F |
| 45* | 90.0 | 10.0 | " | " | " | 880 | 1800 | 2.5 | 10$^7$ | D |
| 46* | 60.0 | 40.0 | " | " | " | 750 | 700 | 2.0 | 10$^8$ | B |
| 47 | 90.0 | 10.0 | 80.0 | 15.0 | " | 910 | 2300 | 1.8 | >10$^{10}$ | D |
| 48 | 85.0 | 15.0 | 98.5 | 1.0 | 0.5 | 890 | 1700 | 2.0 | " | " |
| 49 | 80.0 | 20.0 | 59.5 | 40.0 | " | 850 | 1300 | 2.5 | " | B |
| 50* | 99.95 | 0.05 | 75.0 | 25.0 | 0 | 1050 | 10200 | 14.7 | 10$^6$ | F |
| 51* | 90.0 | 10.0 | " | " | " | 950 | 2200 | 8.8 | 10$^7$ | D |
| 52* | 60.0 | 40.0 | " | " | " | 730 | 800 | 5.3 | " | B | within the range of −20 to +20 % at an operating temperature range of −25° C. to +85° C.

D rating, means that a temperature change rate of capacitance with respect to a capacitance at 20° C. lies within the range of −30 to +20 % at an operating temperature range of −25° C. to +85° C.

E rating, means that a temperature change rate of capacitance with respect to a capacitance at 20° C. lies As will be understood from the results shown in Tables 1 and 2, the non-reducing dielectric ceramic composition of the present invention possesses low dielectric loss of less than 5% and high specific resistance of not less than 10$^{10}$ Ω-cm. Further, it has high resistance to reduction, thus making it possible to use copper or copper alloys as a material for internal electrodes of the monolithic ceramic capacitors. In addition, the incorporation of anti-reducing agent into the complex perovskite compound makes it possible to lower its sintering temperature to 1050° C. and below.

In the above examples, the sintering is carried out in a reducing atmosphere consisting of hydrogen, water vapor and nitrogen, but it may be carried out in other neutral or reducing atmosphere consisting of Ar, CO, $CO_2$, $H_2$, $N_2$ or a mixture of these gases.

What I claim is:

1. A non-reducing dielectric ceramic composition consisting essentially of 60 to 99.5 wt % of a basic composition expressed by the general formula:

$$XPb(Mg_{1/3}Nb_{2/3})O_3 - yPb(Zn_{1/3}Nb_{2/3})O_3 - zPbTiO_3$$

where x, y and z are proportions by weight percentage of the three components, $Pb(Mg_{1/3}Nb_{2/3})O_3$, $Pb(Zn_{1/3}Nb_{2/3})O_3$ and $PbTiO_3$, and 0.05 to 40 wt % of an anti-reducing agent incorporated therein and expressed by the general formula:

$$aLi_2O - bRO - cB_2O_3 + (1-a-b-c)SiO$$

where R is at least one element selected from the group consisting of Mg, Ca, Sr and Ba, a, b and c are molar fractions of the respective component and take values within the following respective ranges: $0 \leq a < 0.2$, $0.1 \leq b < 0.55$ $0 = c < 0.4$, said basic composition having a set of proportions, by weight percentage, of the three components, x, y and z, falling within the compositional area encompassed by the polygon ABCD defined by points, A, B, C, and D shown in FIG. 1, the sets of proportions, by weight percentage, of the three components at said points being as follows:

| x | y | z |
|---|---|---|
| 89.0 | 1.0 | 10.0 |
| 80.0 | 10.0 | 10.0 |
| 59.5 | 40.0 | 0.5 |
| 98.5 | 1.0 | 0.5. |

* * * * *